(12) United States Patent
Wu et al.

(10) Patent No.: US 12,696,222 B2
(45) Date of Patent: Jul. 28, 2026

(54) CONTROLLING METHOD OF WIRELESS COMMUNICATION DEVICE AND NETWORK

(71) Applicant: MEDIATEK Inc., Hsinchu City (TW)

(72) Inventors: Zhong-Han Wu, Hsinchu City (TW); Yu-Cheng Huang, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 289 days.

(21) Appl. No.: 18/502,154

(22) Filed: Nov. 6, 2023

(65) Prior Publication Data

US 2024/0155534 A1     May 9, 2024

Related U.S. Application Data

(60) Provisional application No. 63/423,065, filed on Nov. 7, 2022.

(51) Int. Cl.
*H04W 60/04*          (2009.01)
(52) U.S. Cl.
CPC .................................. *H04W 60/04* (2013.01)

(58) Field of Classification Search
CPC ...................................................... H04W 60/04
See application file for complete search history.

(56) References Cited

U.S. PATENT DOCUMENTS

| | | | |
|---|---|---|---|
| 2016/0360508 A1* | 12/2016 | Kawakishi | H04W 72/04 |
| 2021/0168643 A1* | 6/2021 | Yao | H04M 15/66 |
| 2021/0250890 A1* | 8/2021 | Won | H04W 76/50 |
| 2021/0314898 A1* | 10/2021 | Kawasaki | H04W 60/04 |
| 2023/0156583 A1* | 5/2023 | Murray | H04W 48/20 |
| | | | 370/329 |
| 2025/0220616 A1* | 7/2025 | Velev | H04W 60/04 |

* cited by examiner

*Primary Examiner* — Abdullahi Ahmed
(74) *Attorney, Agent, or Firm* — McClure, Qualey & Rodack, LLP

(57) ABSTRACT

Controlling methods of a wireless communication device and a network are provided. The controlling method of the wireless communication device includes the following steps: transmitting a Mobility Registration Update (MRU) request to a network; keeping a Protocol Data Unit (PDU) command received from the network; and processing the PDU command after a predetermined waiting timer counted from receiving an MRU accept from the network is expired.

20 Claims, 4 Drawing Sheets

FIG. 4

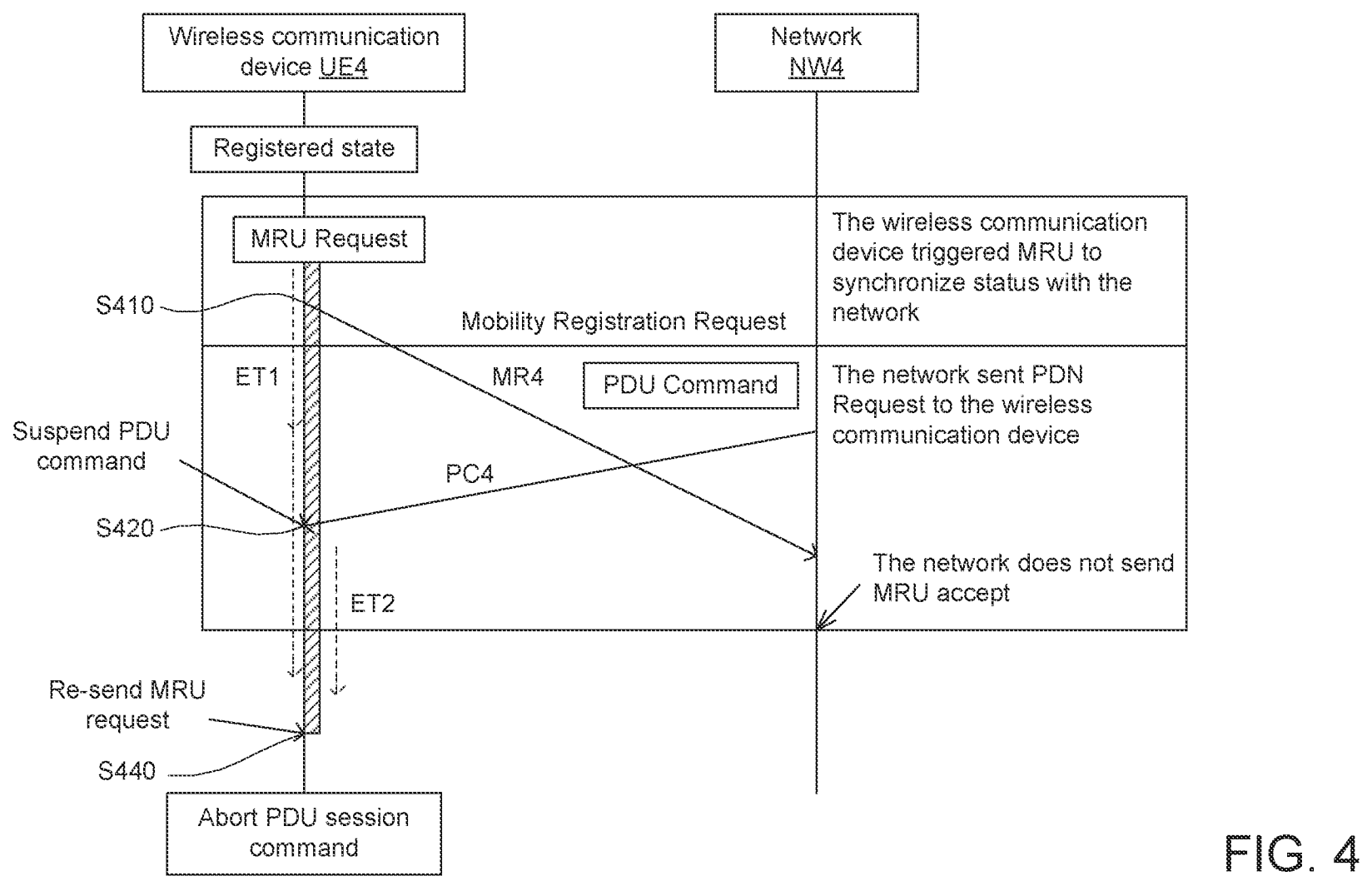

Network
NW4

The wireless communication device triggered MRU to synchronize status with the network The network sent PDN Request to the wireless communication device The network does not send MRU accept Mobility Registration Request PDU Command

MR4

PC4

Wireless communication device UE4

Registered state

MRU Request

ET1

ET2

Abort PDU session command

S410

Suspend PDU command

S420

Re-send MRU request

S440

CONTROLLING METHOD OF WIRELESS COMMUNICATION DEVICE AND NETWORK

This application claims the benefit of U.S. provisional application Ser. No. 63/423,065, filed Nov. 7, 2022, the disclosure of which is incorporated by reference herein in its entirety.

TECHNICAL FIELD

The disclosure relates in general to a controlling method, and more particularly to a controlling method of a wireless communication device and a network.

BACKGROUND

Along with the development of the wireless communication technology, various wireless communication devices are invented. In the current communication technology, A 5GSM message might be process during 5GMM procedure. The wireless communication device can only initiate the 5GSM procedure when there is a 5GMM context established at the wireless communication device.

There is a race condition between the wireless communication device and the network when they both initiate procedures at the same time.

In traditional, the wireless communication device will ignore the Protocol Data Unit (PDU) Session message and wait for next procedure. The network will process the Mobility Registration Update (MRU) instead of the PDU Session procedure. The network periodically sends the PDU session message for every retry time until receiving the PDU response.

When the wireless communication device completes the MRU procedure, the wireless communication device must wait for the retry timer to trigger the next PDU session message. Therefore, this conflict might cause the waste of time.

SUMMARY

The disclosure is directed to a controlling method of a wireless communication device and a network. The 3rd Generation Partner Project (3GPP) IP Multimedia Subsystem (IMS) standard is modified to retry the network's session management (SM) message after the Mobility Registration Update (MRU) procedure is finished. As such, the waiting time is saved to improve the user experience.

According to one embodiment, a controlling method of a wireless communication device is provided. The controlling method of the wireless communication device includes the following steps: transmitting a Mobility Registration Update (MRU) request to a network; keeping a Protocol Data Unit (PDU) command received from the network; and processing the PDU command immediately when an MRU accept is received from the network.

According to another embodiment, a controlling method of a wireless communication device is provided. The controlling method of a wireless communication device includes the following steps: transmitting a Mobility Registration Update (MRU) request to a network; keeping a Protocol Data Unit (PDU) command received from the network; and processing the PDU command after a predetermined waiting timer counted from receiving an MRU accept from the network is expired.

According to an alternative embodiment, a controlling method of a network is provided. The controlling method of the network includes the following steps: receiving a Mobility Registration Update (MRU) request from a wireless communication device; and transmitting a Protocol Data Unit (PDU) command to the wireless communication device when an MRU accept is transmitted.

BRIEF DESCRIPTION OF THE DRAWINGS

FIG. 4 illustrates a controlling method of a wireless communication device UE4 according to one embodiment.

Figure 1:
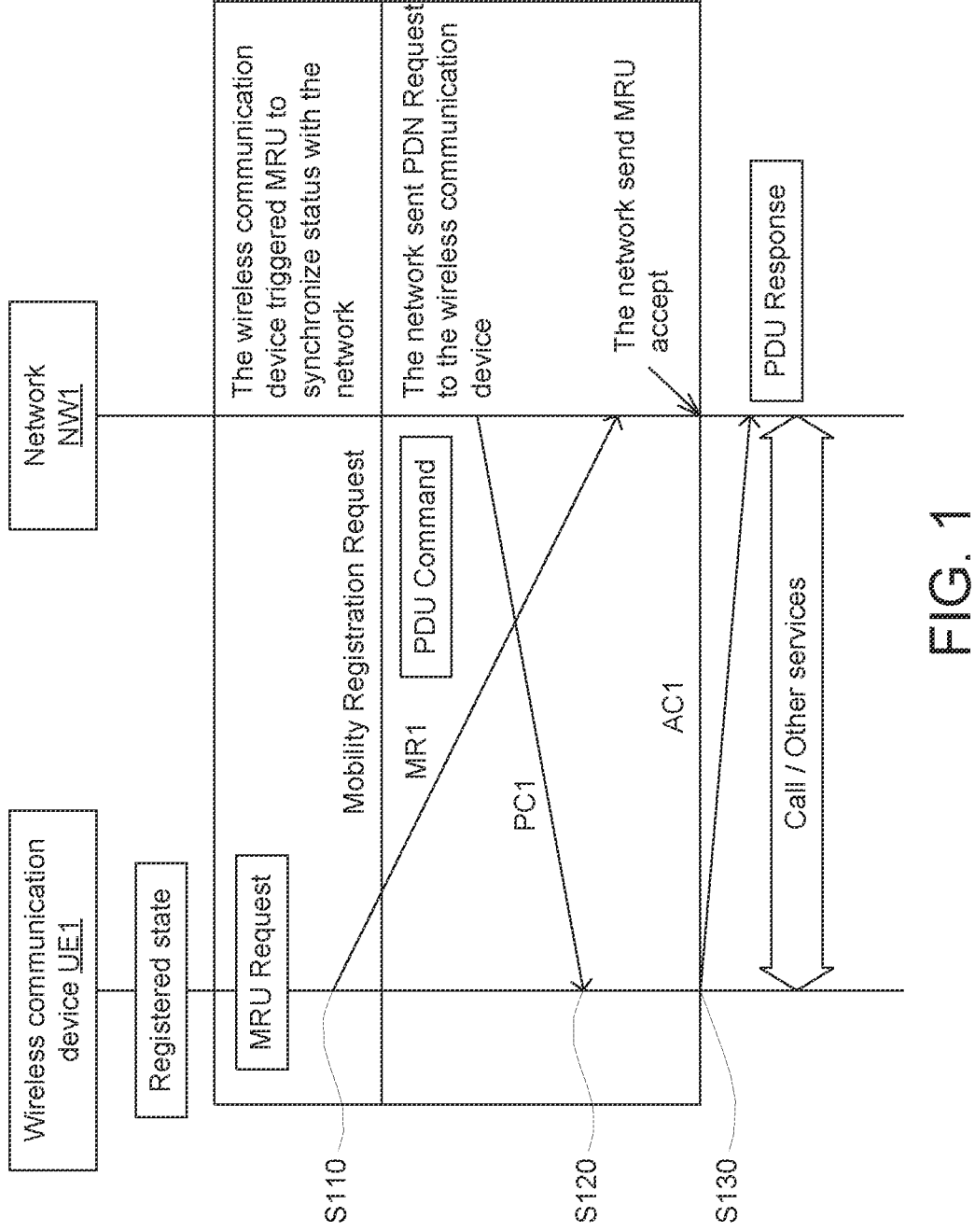
FIG. 1 illustrates a controlling method of a wireless communication device UE1 according to one embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

The terms "comprise," "comprising," "include," "including," "has," "having," etc. used in this specification are open-ended and mean "comprises but not limited." The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

Please refer to FIG. 1, which illustrates a controlling method of a wireless communication device UE1 according to one embodiment. In this embodiment a Non-Access-Stratum (NAS) message is deferred until on-going procedure, e.g., Mobility Registration Update (MRU), is finished. The wireless communication device UE1 waits for an MRU accept AC1 and then process a Protocol Data Unit (PDU) command PC1 from the network NW1 immediately.

In detail, the controlling method of the wireless communication device UE1 includes steps S110 to S130. After the wireless communication device UE1 registered the state, the process proceeds to the step S110. In the step S110, the wireless communication device UE1 transmits a MRU request MR1 to the network NW1.

At this time, the network NW1 may transmit the PDU command PC1 to the wireless communication device UE1. Then, the process proceeds to the step S120.

In the step S120, the wireless communication device UE1 keeps the PDU command PC1 received from the network NW1. In this embodiment, the PDU command PC1 is kept until receiving another PDU command. As shown in the FIG. 1, the PDU command PC1, which is kept, is received after transmitting the MRU request MR1.

Then, the network NW1 may transmit the MRU accept AC1 to the wireless communication device UE1. Before receiving the MRU accept AC1, the PDU command PC1 is kept by the wireless communication device UE1.

In the step S130, the wireless communication device UE1 processes the PDU command PC1 immediately when the MRU accept AC1 is received from the network NW1. That is, the PDU command PC1 is kept until receiving the MRU accept AC1.

According to the embodiment described in the FIG. 1, the PDU command PC1 could be processed immediately without waiting the next PDU command. Therefore, the waiting time is saved to improve the user experience. In one embodiment, the saved waiting time may be more than 15 seconds.

Figure 2:
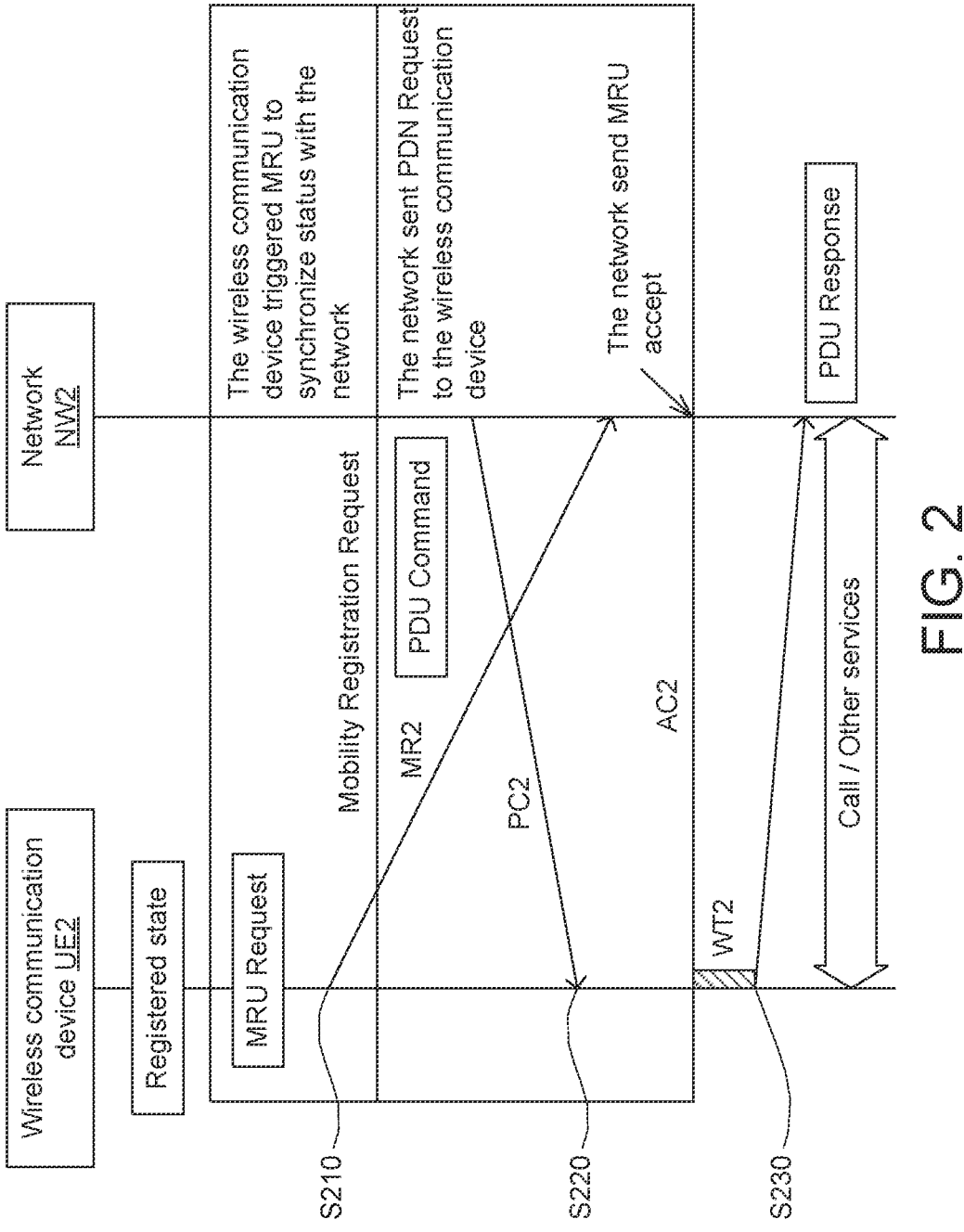
FIG. 2 illustrates a controlling method of a wireless communication device UE2 according to one embodiment.

Please refer to FIG. 2, which illustrates a controlling method of a wireless communication device UE2. This embodiment provides a deferred process NAS message from a network NW2 with a guard timer to wait for new message from the network NW2. The wireless communication device UE2 waits for the MRU accept AC2 and then a process the PDU command PC2 from the network NW2 until a predetermined waiting timer WT2 is expired.

In detail, the controlling method of the wireless communication device UE2 includes steps 210 to S230. After the wireless communication device UE2 registered the state, the process proceeds to the step S210. In the step S210, the wireless communication device UE2 transmits a MRU request MR2 to the network NW2.

At this time, the network NW2 may transmit the PDU command PC2 to the wireless communication device UE2. Then, the process proceeds to the step S220.

In the step S220, the wireless communication device UE2 keeps the PDU command PC2 received from the network NW2. In this embodiment, the PDU command PC2 is kept until receiving another PDU command. As shown in the FIG. 2, the PDU command PC2, which is kept, is received after transmitting the MRU request MR2.

Then, the network NW2 may transmit the MRU accept AC2 to the wireless communication device UE2. Before receiving the MRU accept AC2, the PDU command PC2 is kept by the wireless communication device UE2.

Then, the predetermined waiting timer WT2 starts to count if the MRU accept AC2 is received from the network NW2.

Next, in the step S230, the wireless communication device UE2 processes the PDU command PC2 after the predetermined waiting timer WT2 counted from receiving the MRU accept AC2 from the network NW2 is expired. That is, the PDU command PC2 is kept until the predetermined waiting timer WT2 counted from receiving the MRU accept AC2 is expired.

In one embodiment, if the wireless communication device receives any 5GSM message within the predetermined waiting timer WT2, the wireless communication device UE2 shall stop the timer and proceed with the network-initiated 5GSM message. Otherwise, the wireless communication device UE2 shall process the previous suspend 5GSM procedure upon the predetermined waiting timer WT2 is expired.

According to the embodiment described in the FIG. 2, the PDU command PC2 could be processed without waiting the next PDU command. Therefore, the waiting time is saved to improve the user experience. In one embodiment, the saved waiting time may be more than 15 seconds.

Figure 3:
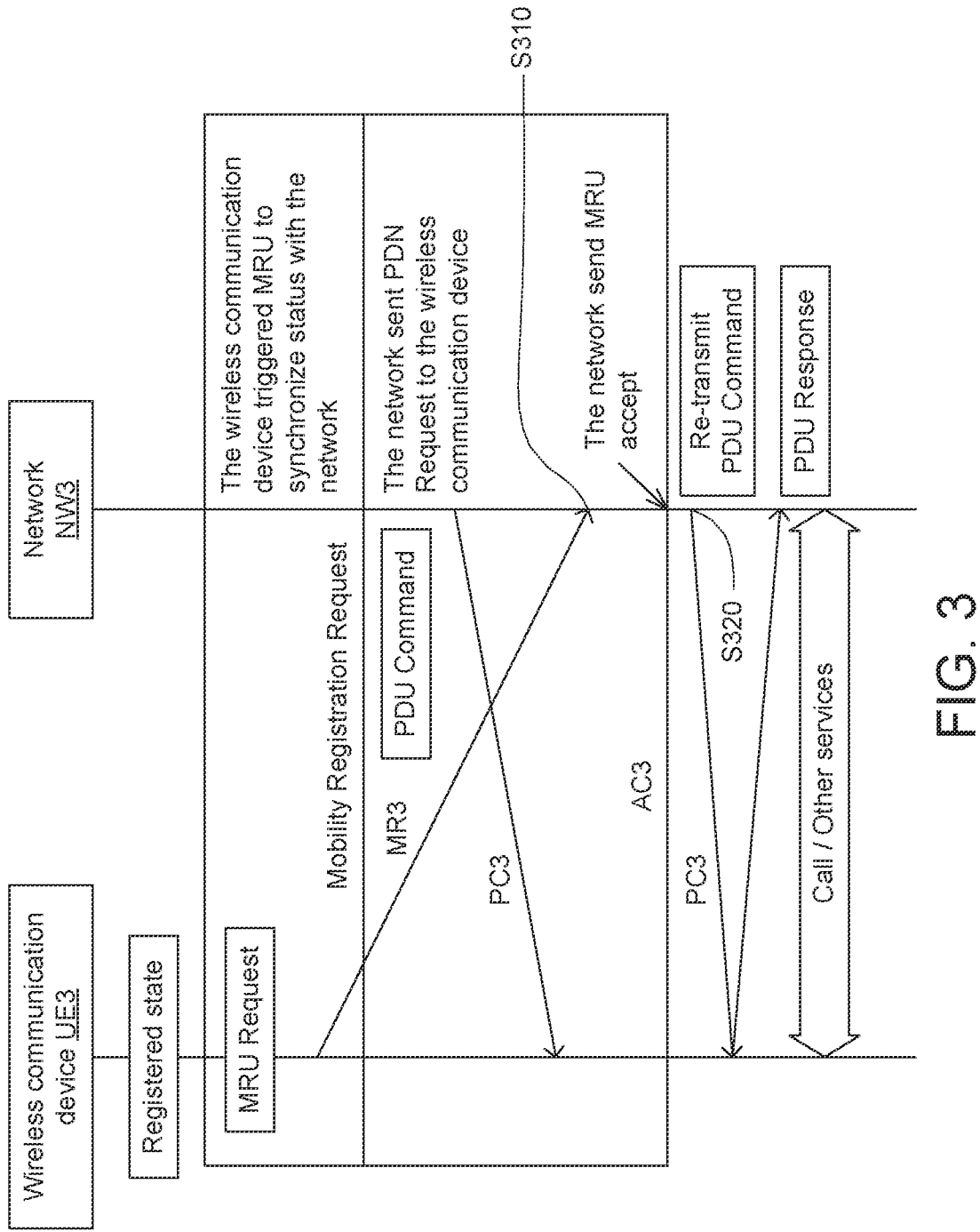
FIG. 3 illustrates a controlling method of a network NW3 according to one embodiment.

Please refer to FIG. 3, which illustrates a controlling method of a network NW3. In this embodiment, the ongoing 5GSM procedure is suspended prior to the MRU request.

In detail, the controlling method of the network NW3 includes steps S310 to S320. After a wireless communication device UE3 registered the state, the wireless communication device UE3 may generates and transmits a Mobility Registration Update (MRU) request MR3 to the network NW3.

At this time, the network NW3 may try to transmit a PDU command PC3 to the wireless communication device UE3. In this embodiment, the PDU command PC3 is not periodically resend.

Then, in the step S310, the network NW3 receives a MRU request MR3 from the wireless communication device UE3. After processing, the network NW3 transmits an MRU accept AC3 to the wireless communication device UE3.

At this time, the process proceeds to the step S320. In the step S320, the network NW3 transmits the PDU command PC3 to the wireless communication device UE3. In this embodiment, the PDU command PC3 is not periodically send until transmitting the MRU accept AC3.

In one embodiment, upon receiving the MRU request MR3 from the wireless communication device UE3, if the PDU session is in state "PDU SESSION INACTIVE PENDING", "PDU SESSION MODIFICATION PENDING" or "PROCEDURE TRANSACTION PENDING", the network NW3 shall suspend the ongoing 5GSM procedure, and after the MRU procedure completes, the network may re-transmit the 5GSM signaling to the wireless communication device UE3.

According to the embodiment described in the FIG. 3, the wireless communication device UE3 could receive and process the PDU command PC3 without waiting the retry time. Therefore, the waiting time is saved to improve the user experience. In one embodiment, the saved waiting time may be more than 15 seconds.

Please refer to FIG. 4, which illustrates a controlling method of a wireless communication device UE4. In this embodiment, the controlling method of the wireless communication device UE4 includes step S410, S420 and S440. After the wireless communication device UE4 registered the state, the process proceeds to the step S410. In the step S410, the wireless communication device UE4 transmits an MRU request MR4 to a network NW4. When the MRU request MR4 is transmitted, a first expiry timer ET1 starts to count. The first expiry timer ET1 is, for example, a timer described in T3510. For example, the first expiry timer ET1 is 15 seconds.

Before receiving the MRU request MR4, the network NW4 may transmit a PDU command PC4 to the wireless communication device UE4. Then, the process proceeds to the step S420.

In the step S420, the wireless communication device UE4 keeps the PDU command PC4 received from the network NW4. In this embodiment, the PDU command PC4 is kept until receiving another PDU command. As shown in the FIG. 4, the PDU command PC4, which is kept, is received after transmitting the MRU request MR4. When the PDU command PC4 is received, a second expiry timer ET2 starts to count. The second expiry timer ET2 is less than the first expiry timer ET1. In one embodiment, the second expiry timer ET2 could be less than half of the first expiry timer ET1.

Then, the wireless communication device UE4 waits for an MRU accept. Before receiving the MRU accept, the PDU command PC4 is kept by the wireless communication device UE4.

In the embodiment of the FIG. 4, the network NW4 rejects the MRU request MR4 and does not send any MRU accept to the wireless communication device UE4.

At the step S440, the wireless communication device UE4 aborts the PDU command PC4 which is kept after the first expiry timer ET1 countered from transmitting the MRU request MR4 is expired or the second expiry timer ET2 countered from receiving the PDU command PC4 is expired.

That is to say, when the MRU request MR4 is rejected by the network NW4, the wireless communication device UE4 will abort the suspended 5GSM procedure after the first expiry timer ET1 is expired or the second expiry timer ET2 is expired.

According to the embodiments described above, the 3GPP IMS standard is modified to retry the network's session management (SM) message after the MRU procedure is finished. As such, the waiting time is saved to improve the user experience.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A controlling method of a wireless communication device, comprising:
   transmitting a Mobility Registration Update (MRU) request to a network;
   keeping a Protocol Data Unit (PDU) command received from the network; and
   processing the PDU command immediately when an MRU accept is received from the network.

2. The controlling method of the wireless communication device according to claim 1, wherein the PDU command is kept until receiving another PDU command.

3. The controlling method of the wireless communication device according to claim 1, wherein the PDU command is kept, if the MRU accept is not received.

4. The controlling method of the wireless communication device according to claim 1, wherein the PDU command is received after transmitting the MRU request.

5. The controlling method of the wireless communication device according to claim 1, wherein the PDU command, which the wireless communication device is kept, is received before receiving the MRU accept.

6. The controlling method of the wireless communication device according to claim 1, further comprising:

aborting the PDU command, which is kept, after a first expiry timer countered from transmitting the MRU request is expired or a second expiry timer countered from receiving the PDU command is expired.

7. The controlling method of the wireless communication device according to claim 6, wherein the second expiry timer is less than the first expiry timer.

8. The controlling method of the wireless communication device according to claim 6, wherein the second expiry timer is less than half of the first expiry timer.

9. The controlling method of the wireless communication device according to claim 6, wherein the first expiry timer is 15 seconds.

10. The controlling method of the wireless communication device according to claim 6, wherein the second expiry timer is less than 15 seconds.

11. A controlling method of a wireless communication device, comprising:
   transmitting a Mobility Registration Update (MRU) request to a network;
   keeping a Protocol Data Unit (PDU) command received from the network; and
   processing the PDU command after a predetermined waiting timer counted from receiving an MRU accept from the network is expired.

12. The controlling method of the wireless communication device according to claim 11, wherein the PDU command is kept until receiving another PDU command.

13. The controlling method of the wireless communication device according to claim 11, wherein the PDU command is kept, if the MRU accept is not received.

14. The controlling method of the wireless communication device according to claim 11, wherein the PDU command is received after transmitting the MRU request.

15. The controlling method of the wireless communication device according to claim 11, wherein the PDU command, which the wireless communication device is kept, is received before receiving the MRU accept.

16. The controlling method of the wireless communication device according to claim 11, further comprising:
   aborting the PDU command, which is kept, after a first expiry timer countered from transmitting the MRU request is expired or a second expiry timer countered from receiving the PDU command is expired.

17. The controlling method of the wireless communication device according to claim 16, wherein the second expiry timer is less than the first expiry timer.

18. The controlling method of the wireless communication device according to claim 16, wherein the second expiry timer is less than half of the first expiry timer.

19. The controlling method of the wireless communication device according to claim 16, wherein the first expiry timer is 15 seconds.

20. A controlling method of a network, comprising:
   receiving a Mobility Registration Update (MRU) request from a wireless communication device; and
   transmitting a Protocol Data Unit (PDU) command to the wireless communication device when an MRU accept is transmitted.

* * * * *